Patented June 27, 1944

2,352,528

UNITED STATES PATENT OFFICE 2,352,528

ANTIHEMORRHAGIC COMPOUND

Louis F. Fieser, Belmont, Mass., assignor to Research Corporation, New York, N. Y., a corporation of New York No Drawing. Application July 1, 1939, Serial No. 282,427

9 Claims. (Cl. 260—396)

This invention relates to certain new and useful improvements in compounds having antihemorrhagic activity and processes for their production. Among such substances may be mentioned various derivatives of 1,4-naphthoquinone, particularly those having an alkyl or alkenyl substituent in the 2-position and in which the 3-position contains hydrogen or an alkyl or alkenyl radical and which may also contain substituents in the benzene ring of the molecule, such as for instance: 2,3-dimethyl-1,4-naphthoquinone, 2-allyl-1,4-naphthoquinone, 2,6-dimethyl-1,4-naphthoquinone, 2,7-dimethyl-1,4-naphthoquinone, 3,7-dimethyl-2-allyl-1,4-naphthoquinone, 2,3-diallyl-1,4-naphthoquinone, and 2,3-diallyl-6,7-dimethyl-1,4-naphthoquinone.

Other 1,4-naphthoquinone derivatives in which the substituent in the 2- and/or 3-position is a long-chain radical are also of importance. Among such may be mentioned the phytyl, farnesyl, cetyl, tetradecyl, octadecyl, and dodecyl derivatives.

Such important derivatives of this character may be exemplified by the following structure:

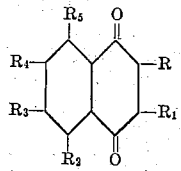

where R is an alkyl or alkenyl radical, and $R_1$, $R_2$, $R_3$, $R_4$ and $R_5$ may be hydrogen or any hydrocarbon radical.

The work of Dam, Almquist, Doisy, Karrer, and others has shown that anti-hemorrhagic extracts can be made from alfalfa, green leaves of chestnuts, fish meal, and various other sources, and it has been suggested that the anti-hemorrhagic principle is a quinone. Almquist (Jr. Amer. Chem. Soc., vol. 61, page 1611, 1939) has reported that phthiocol (2-hydroxy-3-methyl-1,4-naphthoquinone) possesses some anti-hemorrhagic activity.

I have now produced naphthoquinone derivatives which are substituted in the 2-position with an alkyl or alkenyl radical, the 3-position being alkyl or alkenyl or hydrogen, and have found that such new compounds exhibit anti-hemorrhagic properties in much greater degree than naphthoquinone itself or its derivatives in which either position 2 or 3 is substituted by a hydroxyl group.

My findings in this respect are further substantiated by the fact that experiments or tests with the known compounds lapachol and lomatiol, which are structurally related to phthiocol, have indicated that these latter substances likewise exhibit only a weak anti-hemorrhagic action in comparison with the alkyl and alkenyl substituted compounds described herein.

I have found that 2,3-dimethyl-1,4-naphthoquinone, 2-allyl-1,4-naphthoquinone, 2,3-diallyl-1,4-naphthoquinone, and 2,3-diallyl-6,7-dimethyl-1,4-naphthoquinone exhibit anti-hemorrhagic action in pronounced degree.

It has also been observed that the 2,6- and 2,7-dimethyl-derivatives of 1,4-naphthoquinone exhibit some anti-hemorrhagic action.

The following examples are presented by way of illustration of preferred embodiments of my invention, it being understood, however, that various modifications may be made without departing from the spirit and scope thereof.

Examples (1) *2-allyl-1,4-naphthoquinone.*—A diazo solution is prepared by dissolving 2.3 g. of sulfanilic acid dihydrate and 0.6 g. of sodium carbonate in 10 cc. of water, cooling to 15°, adding 0.83 g. of sodium nitrite in 2 cc. of water, and pouring the solution onto a mixture of 2.3 cc. of concentrated hydrochloric acid and 13 g. of ice. The resulting suspension, after standing at 0° for fifteen minutes, is added to a cooled solution prepared from 2.4 g. of sodium hydroxide, 13 cc. of water, and 2.02 g. of 2-allyl-1-naphthol [prepared according to Claisen and Eisleb, Ann., 401, 21 (1913); B. P. 140–144° at 4 mm.]. After standing for one hour the deep purple-red solution of the resulting azo compound is heated to 40–50° and treated with 5 g. of sodium hydrosulfite, added in 0.5 g. portions. When the original color is discharged and there is no further change, the mixture is cooled in an ice bath and the precipitate collected and washed with 1% sodium hydrosulfite solution. The slightly tan aminoallyl-naphthol is dissolved by heating in a solution of 1.4 cc. of concentrated hydrochloric acid and 0.45 g. of stannous chloride in 17.5 cc. of water and the filtered solution is treated with 2 cc. of concentrated hydrochloric acid and cooled to 0°. 2-allyl-4-amino-1-naphthol hydrochloride separates as colorless needles, and is washed with 6 N hydrochloric acid; the yield is 1.60 g. (62% of the theoretical). A sample was dried for analysis at 110° and 15 mm. pressure. The salt is rather sparingly soluble in water.

*Anal.*—Calcd. for $C_{13}H_{14}ONCl$: N, 5.49. Found (Kjeldahl): N, 5.90.

For oxidation, 1 g. of the above hydrochloride is dissolved in 90 cc. of water containing 0.5 cc. of concentrated hydrochloric acid and the solution is treated with 2.7 g. of ferric chloride hexahydrate in 5 cc. of water and 1 cc. of concentrated hydrochloric acid. The solution becomes deep orange and then greenish black, and a solid product separates. After cooling in ice the precipitate is collected and extracted while moist with ether. After filtering the ethereal solution from some black residue and clarifying with decolorizing carbon, the solvent is evaporated and the residue crystallized from ether-petroleum ether. There is obtained 0.65 g. (76%) of 2-allyl-1,4-naphthoquinone in the form of yellow needles, M. P. 36–36.5°.

Anal.—Calcd. for $C_{13}H_{10}O_2$: C, 78.77; H, 5.09. Found: C, 78.82; H, 5.14.

The substance is very readily soluble in benzene, ether, and alcohol, less soluble in ligroin or petroleum ether, very sparingly soluble in water. The ultraviolet absorption spectrum in ethanol shows the following maxima: 246, 251 m$\mu$ (log $\epsilon$=4.31), 332 m$\mu$ (log $\epsilon$=3.43); in hexane solution the most intense absorption band is clearly resolvable into two maxima (243, 251 m$\mu$, log $\epsilon$=4.1), and there is a second intense band with a maximum at 260 m$\mu$ (log $\epsilon$=3.9). The quinone darkens rapidly in direct sunlight.

(2) *3,7-dimethyl-2-allyl-1,4-naphthoquinone.*—For the introduction of the allyl group, 5 g. of 2,6-dimethyl-8-naphthol [Weissgerber and Kruber, Ber., 52, 360 (1919)] is heated with stirring for 15 hours with 3 g. of allyl bromide, 8 g. of finely powdered potassium carbonate, and 75 cc. of purified acetone. The mixture is diluted with water, extracted with ether, and after removing a trace of phenolic material by extraction of the ether layer with 10% alkali containing a little sodium hydrosulfite, the ethereal solution is dried and evaporated. The oil residue of crude 2,6-dimethyl-8-naphthol allyl ether is heated with 30 cc. of freshly distilled dimethylaniline in an atmosphere of nitrogen for 2¾ hours in a salt bath maintained at 240° and the cooled solution taken up in ether and extracted with dilute hydrochloric acid. The ethereal solution is then extracted repeatedly with 10% potassium hydroxide solution containing a trace of sodium hydrosulfite and Claisen's mixture (aqueous alkali-methanol), and the combined, filtered alkaline extracts are acidified and extracted with ether. After drying with sodium sulfate and removing the solvent, the product (2,6-dimethyl-7-allyl-8-naphthol) is distilled, B. P. 152–157° at 2 mm. The once distilled material is nearly pure and satisfactory for the next step.

Anal.—Calcd. for $C_{15}H_{16}O$: C, 84.86; H, 7.60. Found: C, 84.20; H, 7.74.

Coupling with diazotized sulfanilic acid is conducted as in Example 1 and the crude 2,6-dimethyl-7-allyl-5-amino-8-naphthol collected as a nearly colorless precipitate; yield, 2.3 g. The substance is very sparingly soluble in the usual solvents and dissolves to only a slight extent in boiling dilute hydrochloric acid (giving with excess acid fine, colorless needles of the hydrochloride). For oxidation, 1.3 g. of the free amine is suspended in 50 cc. of acetone, 30 cc. of 0.7 M ferric chloride solution (27 g. ferric chloride crystals and 10 cc. of concentrated hydrochloric acid diluted to 245 cc.) is added, and on warming and stirring the solid goes into solution (10–15 minutes). The dark yellow solution is cooled, diluted with 500 cc. of water and the oily 3,7-dimethyl-2-allyl-1,4-naphthoquinone extracted with ether. The washed solution is clarified with Norite, dried with sodium sulfate, and the solvent removed in vacuum. The residue is taken up in petroleum ether (B. P. 20–40°) and on cooling the quinone crystallizes as light yellow needles, M. P. 42–42.5°. Recrystallization from petroleum ether does not raise the melting point. The yield is 0.75 g. (57%). The properties are similar to those of the above described allyl compound.

Anal.—Calcd. for $C_{15}H_{14}O_2$: C, 79.69; H, 6.24. Found: C, 79.82; H, 6.36.

(3) *2,3-diallyl-1,4-naphthoquinone.* Method a.—The $\alpha$-naphthohydroquinone required as starting material is prepared by dissolving 10 g. of $\alpha$-naphthoquinone in 50–75 cc. of hot alcohol and adding gradually a solution of 20 g. of stannous chloride crystals and 20 cc. of concentrated hydrochloric acid in 50 cc. of water. After heating gently until the color fades to pale yellow and filtering if necessary, the solution is diluted with water to the point of saturation and cooled in an ice bath. The product separates as colorless or slightly gray needles; yield 8.2–8.8 g.

Allylation is conducted as in Example 2, using 6.1 g. of $\alpha$-naphthohydroquinone, 6.5 cc. of allyl bromide, 10.4 g. of potassium carbonate, and 20 cc. of acetone, and refluxing for 10–15 hours. After dilution with water the product is taken up in ether and the rather dark solution extracted with water and with dilute alkali containing sodium hydrosulfite. The solution is dried with magnesium sulfate, concentrated, and cooled to −78°. The $\alpha$-naphthohydroquinone diallyl ether produced separates from the well cooled solution as a pasty solid, and after adding a little petroleum ether this can be collected by filtration. An additional quantity of the ether can be obtained from the filtrate after diluting this with petroleum ether and clarifying it by filtration through a tower of activated alumina, followed by concentration and cooling to −78°. The yield of material satisfactory for the next step is 1.5–3.5 g. Repeated crystallization from petroleum ether containing a trace of ether gives colorless plates, M. P. 49.6–50.1°.

Anal.—Calcd. for $C_{16}H_{16}O_2$: C, 79.96; H, 6.72. Found: C, 80.09; H, 6.74.

Since the normal rearrangement product is a very sensitive substance it is advantageously protected as formed by acetylation. A mixture of 3 g. of the diallyl ether, 3 cc. of diethylaniline, and 3 cc. of acetic anhydride is heated at 200–210° in an atmosphere of nitrogen for 5–6 hours. The cooled mixture is taken into ether and the solution extracted with dilute hydrochloric acid, dried, and evaporated to a small volume. On slow cooling 2,3-diallyl-1,4-naphthohydroquinone diacetate separates as large, hexagonal prisms; yield 3.2 g. The substance is readily soluble in benzene or alcohol, and moderately soluble in ligroin. Recrystallized from ether-petroleum ether or from ligroin (B. P. 70–90°) it formed large, colorless prisms, M. P. 92.5–93°.

Anal.—Calcd. for $C_{20}H_{20}O_4$: C, 74.05; H, 6.22. Found C, 74.18; H, 6.33.

The diacetate is resistant to hydrolysis by alkalies and considerable material is recovered unchanged after boiling for several hours with 12% sodium hydroxide solution. Hydrolysis occurs with mixtures of ethanol and 25% alkali on warming, but the isolation of a satisfactory reaction produce is not easily accomplished. For best results the diacetate is cleaved with Grignard reagent having little reducing action.

To the Grignard solution prepared under nitrogen from 3 g. of magnesium, 100 cc. of absolute ether and sufficient methyl bromide to give complete reaction, is added 2.86 g. of 2,3-diallyl-1,4-naphthohydroquinone diacetate. The solution is refluxed for 45 minutes, the ether is largely replaced with dry benzene, and after refluxing for one-half hour longer the mixture is decomposed with 25% ammonium chloride solution and a little acid. The organic layer is washed and dried and stirred mechanically with 2.05 g. of silver oxide and 10 g. of Dryrite for 10–15 minutes. The filtered, yellow solution is concentrated, eventually under nitrogen, and the residual, dark yellow oil is cooled well and caused to solidify. After two crystallizations from 95% alcohol (collecting the crystals in the cold room) the substance forms glistening yellow blades, M. P. 29–30°.

Anal.—Calcd. for $C_{16}H_{14}O_2$: C, 80.65; H, 5.92. Found C, 80.53; H, 6.02.

The quinone is very readily soluble in ether or petroleum ether, readily soluble in alcohol, sparingly soluble in water. It gives a yellow or brown solution in concentrated sulfuric acid. A highly characteristic color test is obtained by adding a drop of 10% aqueous potassium hydroxide to a dilute solution of the quinone in alcohol; the solution becomes pale greenish blue, then deep blue, which slowly fades to a dull, weak green-brown.

Cleavage of 2,3-diallyl-1,4-naphthohydroquinone diacetate by refluxing overnight with ethyl or n-butylmagnesium bromide in ether results in some reduction, for on working up the reaction mixture as above there is obtained a small amount of a much less soluble quinone which forms yellow needles from alcohol, M. P. 129–130°. Analysis shows that it contains two hydrogen atoms more than the normal product.

Anal.—Calcd. for $C_{16}H_{16}O_2$: C, 79.97; H, 6.71. Found C, 80.06, 79.93; H, 6.78, 6.76.

The absorption spectrum is that of an α-naphthoquinone derivative (maxima at 245, 267, and 330 m$\mu$); probably hydrogen has added to the side chain structure, either with or without formation of an additional ring.

(4) *2,3-diallyl-6,7-dimethyl-1,4-naphthoquinone.*—Hydroquinone is converted to the known diallyl ether [Hahn and Stenner, Z. physiol. Chem. 181, 88 (1929)] more satisfactorily by the following method than by that previously described. A mixture of 44 g. of hydroquinone, 200 cc. of acetone, 96.8 g. of allyl bromide, and 112 g. of potassium carbonate is refluxed for 9 hours, water is added to dissolve the inorganic salts, and the reaction product is extracted with ether. Phenolic material is extracted completely with 1 N sodium hydroxide and the ethereal solution is dried and the solvent evaporated. The oily residue is induced to crystallize from a solution in dilute alkali by cooling and scratching, giving 52 g. of colorless, lustrous plates, M. P. 33–34°; 5 g. of yellowish material is obtained in a second crop, making the total yield 75%.

For rearrangement, 53 g. of hydroquinone diallyl ether is dissolved in 330 cc. of kerosene (B. P. 214°) and the solution refluxed vigorously for 2¼ hours under a stream of nitrogen. The reaction product largely crystallizes on cooling, and a small additional quantity is obtained by concentrating the mother liquor. The combined, almost colorless material was washed with petroleum ether to remove most of the kerosene and dried at 50°; yield, 57.5 g.

Two isomers are separated from this mixture as follows. The material is largely dissolved by heating with 2 liters of water containing a little sodium hydrosulfite and steam distilled to remove kerosene still present. A considerable amount of material remains undissolved as an oily solid. The hot solution is filtered, and on cooling the clean filtrate a large crop of 2,5-diallylhydroquinone separates in a crystalline condition. After collecting this the mother liquid is used to extract a fruther quantity of material from the semi-solid residue. After heating to boiling, the solution is separated from a small amount of dark brown oil by filtration and a second crop of the 2,5-isomer obtained on cooling. The total yield of this isomer is 25 g.; recrystallization from 2 liters of water gave 15.2 g. (29%) of pure product in the form of broad flat needles, M. P. 129.5–131°.

Anal.—Calcd. for $C_{12}H_{14}O_2$: C, 75.76; H, 7.42. Found, C, 75.80; H, 7.40.

The combined aqueous mother liquors remaining after removal of the 2,5-isomer on extraction with ether give 22.2 g. of colorless crystalline material consisting largely of 2,3-diallylhydroquinone. This is very soluble in hot water, but crystallizes satisfactorily from this solvent in fine, colorless needles, M. P. 87–90°.

Anal.—Calcd. for $C_{12}H_{14}O_2$: C, 75.76; H, 7.42. Found: C, 76.17; H, 7.60.

For oxidation 2.5 g. of 2,3-diallylhydroquinone is dissolved in 125 cc. of absolute ether and the solution stirred mechanically under nitrogen for 3 hours with 6.3 g. of silver oxide and 6.5 g. of sodium sulfate. The yellow solution is evaporated, leaving a residue of 2,3-diallyl-1,4-benzoquinone as a dark reddish yellow oil (2.4 g.), which is used directly for the next step.

A solution of 2.44 g. of 2,3-diallyl-1,4-benzoquinone and 3.4 cc. of 2,3-dimethylbutadiene in 3 cc. of benzene is refluxed for 20 hours. The diene addition product crystallizes on cooling and it is at once isomerized to 6,7-dimethyl-2,3-diallyl-5,8-dihydro-1,4-naphthohydroquinone by short boiling with dilute alcoholic hydrochloric acid. The brown product when crystallized from alcohol melts at 156.5–159° (yield, 2.34 g.). It can also be obtained by conducting the diene reaction in a sealed tube at 100° for 5 hours and refluxing the product with dilute alcoholic hydrochloric acid.

Anal.—Calcd. for $C_{18}H_{22}O_2$: C, 79.96; H, 8.20. Found: C, 80.27; H, 8.15.

A solution of 0.5 g. of the above hydroquinone in glacial acetic acid is treated at room temperature with a solution of 0.25 g. of chromic anhydride in 10 cc. of 90% acetic acid. A rapid reaction ensues and the temperature rises to about 44°. After being heated to 60° and allowed to cool, the solution is diluted with water and the dull yellow quinone which separates is purified by crystallization from alcohol; yield, 0.4 g. It forms rectangular plates, M. P. 54–56° (sintering at 50°) and appears to be intermediate in degree of oxidation between the starting material and the naphthoquinone derivative.

Anal.—Calcd. for $(C_{18}H_{19}O_2)_x$: C, 80.87; H, 7.16. Found: C, 80.80; H, 7.17.

For further oxidation 1 g. of the intermediate in 20 cc. of glacial acetic acid is treated with 0.3 g. of chromic anhydride and heated to 80°, when the temperature rises spontaneously to 90°; the solution finally is warmed to 100° and allowed to cool. The yellow material which precipitates on diluting with water is crystallized from alcohol giving long flat needles or rectangular plates of 2,3-diallyl-6,7-dimethyl-1,4-naphthoquinone. Both forms are bright yellow and melt at 69.5–70.7°; absorption maxima: 253, 260, 273, 278, 343 m$\mu$.

*Anal.*—Calcd. for $C_{18}H_{18}O_2$: C, 81.17; H, 6.81. Found: C, 81.46; H, 6.96.

(5) *2,3-diallyl-1,4-naphthoquinone. Method b.*—The starting material for this synthesis is monobutadiene-p-benzoquinone [Diels and Alder, Ber., 62, 2337 (1929)]. A mixture of 7 g. of this addition product, 23.8 g. of finely powdered potassium carbonate, 10 cc. of allyl bromide, and 150 cc. of purified acetone is refluxed overnight, diluted with water and extracted with ether. Phenolic material is removed by two washings with alkali containing sodium hydrosulfite, and the light yellow ethereal solution is washed with water, dried with calcium chloride, and evaporated, eventually with suction. The residue is taken up in warm methanol and on cooling the product crystallizes. When washed with methanol the 5,8-dihydro-1,4-naphthohydroquinone diallyl ether is obtained as colorless, pearly plates, M. P. 63–64°; yield, 5.6 g. Recrystallized twice from alcohol, in which it is readily soluble, the ether melts at 64–65°.

*Anal.*—Calcd. for $C_{16}H_{18}O_2$: C, 79.30; H, 7.49. Found: C, 79.51; H, 7.55.

The ether is rearranged to 2,3-diallyl-5,8-dihydro-1,4-naphthohydroquinone by heating 5.6 g. of material in 34 cc. of kerosene under nitrogen in a bath maintained at 240–250° for 2 hours. On cooling, still in a nitrogen atmosphere, the product separates as a crystalline paste. It is collected, washed with petroleum ether, in which it is sparingly soluble, and obtained as completely colorless plates, M. P. 107–108.5°; yield 4.9 g. The substance is moderately soluble in ligroin (B. P. 70–90°) and crystallizes from this solvent in clusters of microcrystals. The solution turns slightly yellow and the crystals acquire a pale tan color. The purified compound melts at 108–109°.

*Anal.*—Calcd. for $C_{16}H_{18}O$: C, 79.30; H, 7.49. Found: C, 79.36; H, 7.78.

Oxidation is conducted in stages as in Example 4, using 4.35 g. of the dihydrohydroquinone in 25 cc. of acetic acid and 4.35 g. of chromic anhydride. After warming to 50° to start the reaction, the temperature is initially kept from rising above 70° by external cooling. Finally the mixture is heated to 100°, cooled, diluted with water, and the oily product extracted with ether. After washing with water and drying, the solvent is evaporated, leaving the intermediate quinone as a yellow oil. Crystals are obtained by cooling to −78°, and the product is then recrystallized from alcohol and obtained as bright yellow, rectangular tablets, M. P. 19.5–21° (sintering at 18°).

*Anal.*—Calcd. for $(C_{16}H_{15}O_2)x$: C, 80.31; H, 6.32. Found: C, 80.11; H, 6.30.

Further oxidation of 3.2 g. of material in 10 cc. of glacial acetic acid is conducted with 1 g. of chromic anhydride at 60–90°, and the collected product (2 g.), being part liquid and part solid, is oxidized again as before, when an exothermic reaction is noted at 80–90°. The product recovered by ether extraction as above is obtained as a yellow oil which is induced to crystallize by cooling a solution in alcohol in a bath of solid carbon dioxide. The 2,3-diallyl-1,4-naphthoquinone then can be recrystallized readily from alcohol and forms long rectangular, bright yellow plates, M. P. 28.2–29.5°. It did not depress the melting point of the sample prepared by the synthesis given in Example 3.

I claim as my invention:

1. 2-allyl-1,4-naphthoquinone.
2. 3,7-dimethyl-2-allyl-1,4-naphthoquinone.
3. In a process for the preparation of 1,4-naphthoquinones substituted in the 2 and 3 positions by beta alkenyl groups the steps consisting in heating at 200–300° C. a di-beta alkenyl ether of 1,4-naphthohydroquinone, isolating the product of the resulting rearrangement as the diacetate and cleaving the diacetate by interaction with a Grignard reagent.
4. Process as defined in claim 3 in which the beta alkenyl group is an allyl group.
5. In a process for the synthesis of 1,4-naphthoquinones having a beta alkenyl group in the quinone ring the steps consisting in heating at 200–300° C. a 1-naphthol ether of a beta unsaturated alcohol, said alcohol being unsubstituted in at least the 2- and 4-positions, and introducing into the 4-position of the resulting C-alkenyl naphthol an amino group by coupling with a diazotized amine and reduction.
6. Process as defined in claim 5 in which the beta alkenyl group is an allyl group.
7. Process for the synthesis of 1,4-naphthoquinones having at least one beta alkenyl group in the quinone ring consisting in heating at 200–300° C. a 1-naphthol ether of a beta unsaturated alcohol, said alcohol being unsubstituted in at least the 2-position and having a member of the group consisting of hydrogen, and a beta unsaturated alkenyl oxy group in the 4-position, and converting the resulting naphthol compound to the naphthoquinone by coupling with diazotized sulfanilic acid, reducing the resulting azo compound to the corresponding amine and oxidizing said amine to the corresponding quinone.
8. In a process for the synthesis of 1,4-naphthoquinones having at least one beta alkenyl group in the quinone ring, the step which consists in heating at 200–300° C. a 1-naphthol ether of a beta unsaturated alcohol of the group consisting of 1-alkenyloxy and 1,4-dialkenyloxy derivatives of naphthalene.
9. A compound of the formula

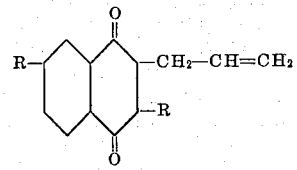

wherein R and R' each is a member of the group consisting of hydrogen and methyl.

LOUIS F. FIESER.